United States Patent
Chen et al.

(10) Patent No.: US 8,762,050 B2
(45) Date of Patent: Jun. 24, 2014

(54) FUEL-SAVING PATH PLANNING NAVIGATION SYSTEM AND FUEL-SAVING PATH PLANNING METHOD THEREOF

(75) Inventors: Wen-Tsuen Chen, Hsinchu (TW); Po-Yu Chen, Kaohsiung (TW); Yi-Min Guo, Dayuan Township (TW)

(73) Assignee: National Tsing Hua University, Hsinchu (TW)

(*) Notice: Subject to any disclaimer, the term of this patent is extended or adjusted under 35 U.S.C. 154(b) by 127 days.

(21) Appl. No.: 13/227,095

(22) Filed: Sep. 7, 2011

(65) Prior Publication Data

US 2013/0060469 A1   Mar. 7, 2013

(51) Int. Cl.
*G01C 21/36*   (2006.01)

(52) U.S. Cl.
USPC ............ 701/414; 701/415; 701/416; 701/527

(58) Field of Classification Search
CPC ........ G01C 21/00; G01C 21/20; G01C 21/26; G01C 21/28; G01C 21/34; G01C 21/3415; G01C 21/3469; G01C 21/3492; G08G 1/00; G08G 1/09; G08G 1/0968; G08G 1/096805; G08G 1/096827; G08G 1/096833; G08G 1/096844; G06F 17/00; G06F 19/00
USPC ......... 701/408, 409, 410, 411, 412, 414, 415, 701/416, 423, 424, 425, 527
See application file for complete search history.

(56) References Cited

U.S. PATENT DOCUMENTS

| | | | | |
|---|---|---|---|---|
| 5,742,922 | A * | 4/1998 | Kim .............................. | 701/423 |
| 6,092,021 | A * | 7/2000 | Ehlbeck et al. ............... | 701/123 |
| 6,484,092 | B2 * | 11/2002 | Seibel ........................... | 701/465 |
| 6,594,576 | B2 * | 7/2003 | Fan et al. ...................... | 701/117 |
| 2001/0029425 | A1 * | 10/2001 | Myr .............................. | 701/200 |
| 2006/0095518 | A1 * | 5/2006 | Davis et al. ................... | 709/206 |
| 2011/0106416 | A1 * | 5/2011 | Scofield et al. ............... | 701/119 |
| 2011/0166774 | A1 * | 7/2011 | Schunder ...................... | 701/201 |

* cited by examiner

*Primary Examiner* — Khoi Tran
*Assistant Examiner* — Adam Mott
(74) *Attorney, Agent, or Firm* — Wang Law Firm, Inc.; Li K. Wang; Stephen Hsu (57) ABSTRACT

A fuel-saving path planning navigation system and a fuel-saving path planning method thereof. A plurality of sensors monitors a plurality of roads respectively and periodically report traffic information to a server. The server comprises a storing module and a processing module. The storing module stores the traffic information as history information. The processing module estimates how many vehicles on a road based upon the history information, calculates fuel consumption of each possible planned path including current fuel consumption based on real-time traffic and future fuel consumption based on the historical information, and plans a most fuel-efficient path. Also, the processing module recalculates fuel consumption of remaining path and changes the remaining path while fuel cost of a new path better 10% than the remaining path.

16 Claims, 7 Drawing Sheets

FUEL-SAVING PATH PLANNING NAVIGATION SYSTEM AND FUEL-SAVING PATH PLANNING METHOD THEREOF

BACKGROUND OF THE INVENTION

1. Field of the Invention

The exemplary embodiment(s) of the present invention relates to a field of navigation system. More specifically, the exemplary embodiment(s) of the present invention relates to a fuel-saving path planning navigation system and a fuel-saving path planning method thereof.

2. Description of Related Art

In Vehicular Ad-hoc Networks (VANETs), each vehicle can detect neighboring traffic conditions by on-board sensor units and exchange the detected information via vehicular infrastructure, which makes VANETs become important and popular. Intelligent Transportation Systems adds information and communication technology to traditional transport infrastructure so it can estimate the real-time traffic condition on roads and provide services like navigation and trip planning to improve driving efficiency. The Global Positioning System (GPS) becomes cheap and popular in our life, and its accuracy is better than past years. Thus the vehicular navigation system is an important application of VANET.

However, traditional navigation systems only plans shortest path according to the electronic maps. When some of shortest paths are congested, user will spend much waiting time. The fuel consumption will also increase because these congested vehicles stop and go frequently. The main drawback of the current navigation systems is that they plan navigation path without considering traffic information. Although some navigation systems can let users switch path manually to another one, they still provide the same paths for different user and they only want to avoid using congested paths. So traffic congestion may occur again.

Thus, for the demand, designing a fuel-saving path planning navigation system and a fuel-saving path planning method thereof to reduce economic and environmental impact has become an urgent issue for the application in the market.

SUMMARY OF THE INVENTION

A fuel-saving path planning navigation system is disclosed. The fuel-saving path planning navigation system comprises a plurality of sensors and a server. The plurality of sensors monitors a plurality of roads respectively and periodically report traffic information to the server. The server comprises a storing module and a processing module. The storing module stores the traffic information as history information. The processing module estimates how many vehicles on a road based upon the history information, calculates fuel consumption of each possible planned path including current fuel consumption based on real-time traffic and future fuel consumption based on the historical information, and plans a most fuel-efficient path based on the following relation:

$$F_x = \rho \times F_{x,N} + (1-\rho) \times F_{x,H};$$

wherein $F_x$ is a fuel consumption of a road x, $\rho$ is a real number between 0 and 1, $F_{x,N}$ is a real time fuel consumption of the road x, and $F_{x,H}$ is a fuel consumption from the history information of the road x. Also, the processing module recalculates fuel consumption of remaining path and changes the remaining path while fuel cost of a new path better 10% than the remaining path.

In this invention, a fuel-saving path planning method is further provided, comprising the following steps: monitoring a plurality of roads respectively and periodically reporting traffic information to a server by a plurality of sensors; storing the traffic information as history information to a storing module; estimating how many vehicles on a road based upon the history information by a processing module; calculating fuel consumption of each possible planned path including current fuel consumption based on real-time traffic and future fuel consumption based on the historical information by the processing module; planning a most fuel-efficient path by the processing module; using the sensors to keep monitoring and reporting the traffic information to the server; and recalculating fuel consumption of remaining path and changing the remaining path by the processing module while fuel cost of a new path better 10% than the remaining path.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of a fuel-saving path planning navigation system and a fuel-saving path planning method thereof.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general purpose machines In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Figure 1:
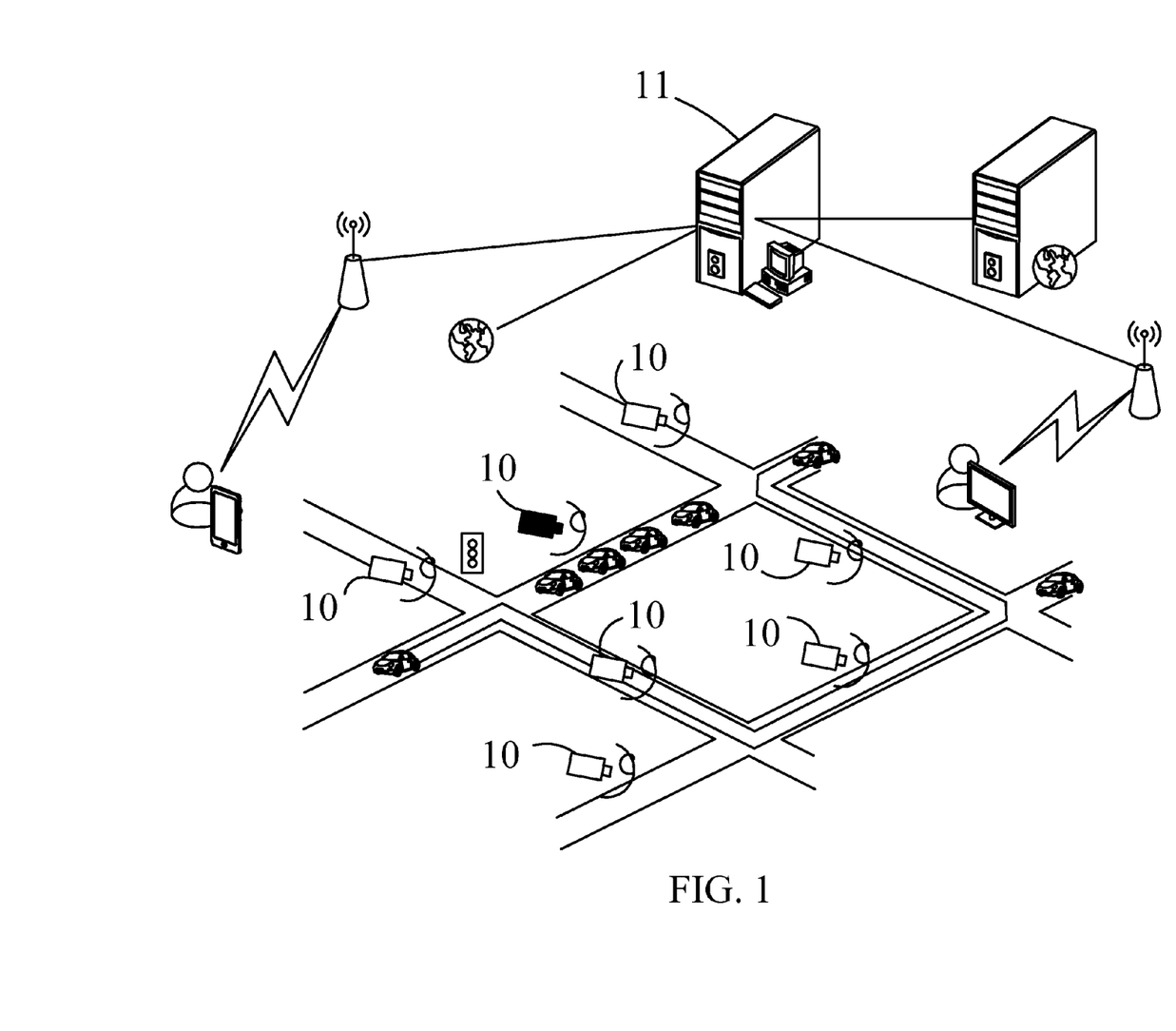
FIG. 1 is a schematic view illustrating an embodiment of a system structure of a fuel-saving path planning navigation system according to the present invention.

Please refer to FIG. 1 which is a schematic view illustrating an embodiment of a system structure of a fuel-saving path planning navigation system according to the present invention. As shown in the figure, the fuel-saving path planning navigation system may comprise a plurality of sensors 10 and a server 11. The server 11 may further comprise a storing module and a processing module. When a user wants to go to a destination, he/she can send request to the navigation server 11 with his/her vehicle location and destination by wireless networks. Then, the server 11 will plan the most appropriate paths to destination according to current and historical traffic information. This invention assumes that vehicles obtain their geographical positions from a GPS receiver or other location servers, simplifies real street map to a directed graph G(V, $E_F$), assumes an intersection as vertex in this graph, and also computes fuel consumption between two intersections as edge in this graph. In the system, small road segments from electric maps are removed, so much unnecessary information can be reduced and system operation can be speed up. This invention also assumes that there is a sensor 10 between two intersections and it can detect average speed of vehicles and delivery data to navigation server 11 periodically. These received traffic information will also be recorded as historical data in navigation server 11.

Single-source to single-destination path planning is described. There are three phases in the approach. Phase 1 is used to initiate each road side sensor and assign detection cycle to it according to its history information. Phase 2 uses fuel-cost function to plan energy-saving path. Phase 3 shows how to maintain the planned paths.

In phase 1, this invention uses traffic flow theory to estimate how many vehicles on a road. Since this invention wants to sense congestion quickly, it is important to know real-time traffic. The approach will compute the density of a road by following equation:

$$D = C \times e^{bV_x} \quad (1)$$

where $V_x$ is the average velocity of a road x, C and b are variables, and D means the vehicle density of road x. In order to use history information to solve variables C and b, equation (1) can be rewritten in a linear form as follows:

$$\log_e D = \log_e C + bV_x \quad (2)$$

The equation (2) can be interpreted as linear equation if we replace $Y = \log_e D$ and $a = \log_e C$ as follows:

$$Y = a + b(x - \bar{x}) \quad (3)$$

This invention makes a least-square regression fit to the history data, and can compute the parameters C and b. For example, assign C=227 and b=−0.0581 to form calculating least-square regression fit. Then, equation (1) can be used to calculate the average density of a road while receiving its average speed form sensors. If the average speed is 50 km per hour, the current vehicle density of road is 17.72 vehicles per meter. Incidentally, the sensors not only sense traffic but also deliver data to server periodically. The delivered data format is as follows:

$$\text{Sensor}_x = \{V_x, \text{Time}, S_x\} \quad (4)$$

where Time means the time when sensor x detects vehicle velocity $V_x$, and $S_x$ is sensor's location. When the proposed system receives this information, the server will initialize history table to record traffic information by following equation:

$$\text{Table}_x = \{V_x, \text{Time}\} \quad (5)$$

In order to reduce message overhead, sensors report traffic information with different cycles according to peak and off-peak periods. In peak period, short detection cycle is assigned to sensors because traffic condition changes quickly. In contrast, a long detection cycle is assigned during the off-peak period.

In phase 2, Dijkstra's algorithm is modified to plan shortest path by considering fuel-consumption. Fuel consumption of each road in the map is computed at the first. But our system only knows location of our teams. The condition of roads is affected by other vehicles, so history information will be used to avoid it. In the approach, real-time traffic information and history information is combined to compute fuel consumption. Fuel consumption from real-time traffic will be calculated at first. Here, this invention assumes that a navigation path is composed of a series of road x. Average speed detected from sensors is used to compute fuel consumption. The formula is as follows:

$$F_{x,N} = F(V_x) \times \frac{L_x}{V_x} \quad (6)$$

$F_{x,N}$ is used to express fuel consumption and velocity $V_x$ is detected form the sensor in road x. The function of fuel consumption will be defined later. In this formula, average traveling time is used to compute $F_{x,N}$. Then, velocity of road is used to estimate the amount of vehicles $N_x$, where $L_x$ is length of road x.

$$N_x = D_x \times L_x = C \times e^{bV_x} \times L_x \quad (7)$$

Therefore, how many vehicles in the road x can be predicted. In multi-source to multi-destination path planning, this value will be increased when the vehicular team move to the road x. After computing real fuel consumption, velocity of road from historical information is used to estimate the amount of vehicles $H_x$, where $L_x$ is length of road x.

$$H_x[t] = D_x \times L_x = C \times e^{bV_x[t]} \times L_x \quad (8)$$

Therefore, the system can use it to know traffic status in future. Then, the weighted number of vehicles, $K_{x,t}$ can be computed, according to history information. The formula is as follows:

$$K_{x,t} = \sum_{t=T_p/I}^{t+T_r} \left( H_x[t] \times e^{-\left(t - \frac{T_p}{I}\right)} \right) \quad (9)$$

Figure 2:
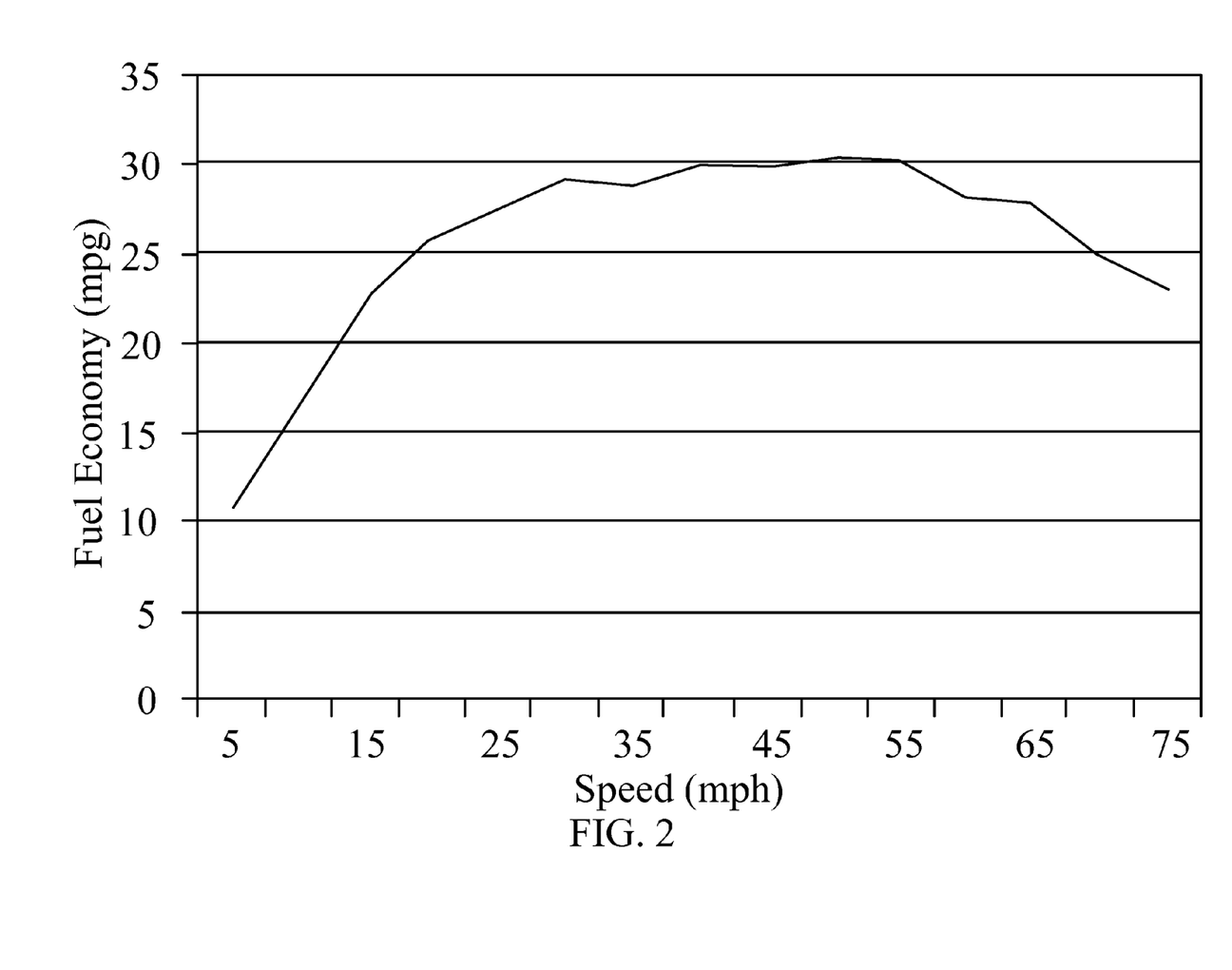
FIG. 2 shows a relationship between mile per gallon and mile per hour.
Figure 3:
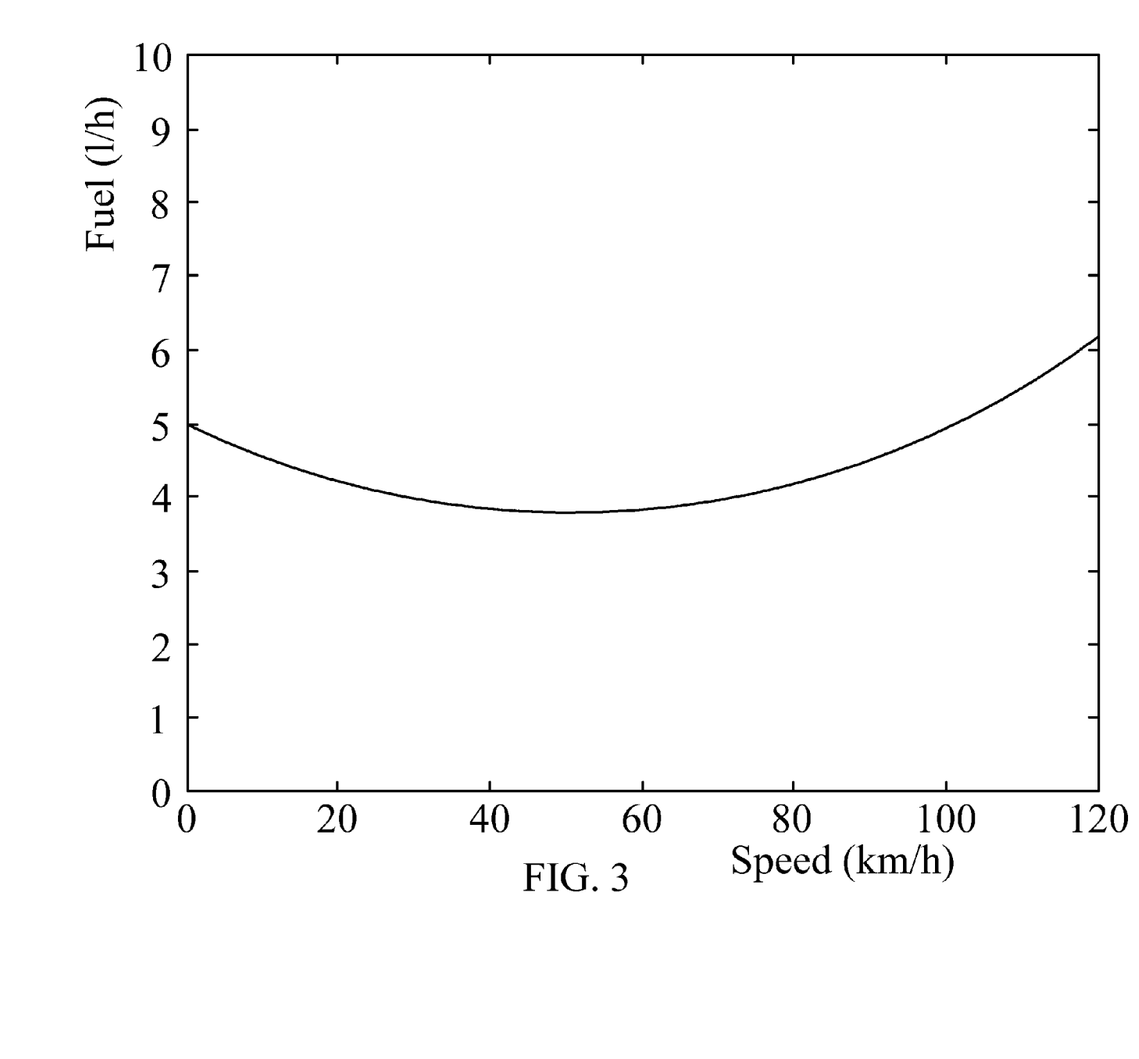
FIG. 3 show a relationship between fuel and cost.

The system does not use history information at this time, because users of the system do not move to this road. $T_p$ is assumed as arrived time of road x. How much time a driver arrive at the road x is computed according to speed of each roads in history information. Then, $T_r$ is assigned to express weighted range of history information. Finally, the weighted proportion decreases exponentially based on $T_p$ and $T_r$. By the way, the fuel consumption is different based on different vehicles, so mathematical formulas is used to approximate fuel cost function and the formula is described as follows:

$$F(V_x) = a \times \left( \frac{1}{b^2} V_x^2 - \frac{1}{b} + c \right) \quad (10)$$

where a, b, and c are vehicular parameters and are different for different kind of vehicle. Also, relationship between mile per gallon and mile per hour is shown in FIG. 2. Mile per gallon is transferred to liter per hour to simplify fuel cost function. In addition, quadratic equation is approximate trend of fuel consumption from real information. Therefore, quadratic equation is used to express the fuel cost function. But this information is wrong in condition of low speed, because fuel consumption of vehicles is not observed in real traffic. A vehicle consumes more fuel in starting and low speed. The fuel consumption will decrease with increasing velocity and increase again when the velocity exceeds a threshold, as shown in FIG. 3. Parameters [a; b; c] are assigned as [5, 100, 1]. 50 km per hour is lowest fuel consumption here, because the speed is most efficient in many models of vehicles. After defining mathematical formulas, $K_x$ is used to express the speed of road x from traffic flow theory. The conversion formula is as follows:

$$V_{x,H} = \frac{1}{b} \times \log \frac{K_x}{C \times L_x} \quad (11)$$

where C and b are computed form equation (1). Then, $V_{x,H}$ is used to calculate fuel consumption from Fuel-cost function. In the system, average traveling time is used to compute fuel consumption of road x. The formula is as follows:

$$F_{x,H} = F(V_{x,H}) \times \frac{L_x}{V_{x,H}} \quad (12)$$

After computing fuel consumption from history information, the variable is used to adjust the weight of real-time and history information. The formula is as follows:

$$F_x = \rho \times F_{x,N} + (1-\rho) \times F_{x,H} \quad (13)$$

Figure 4:
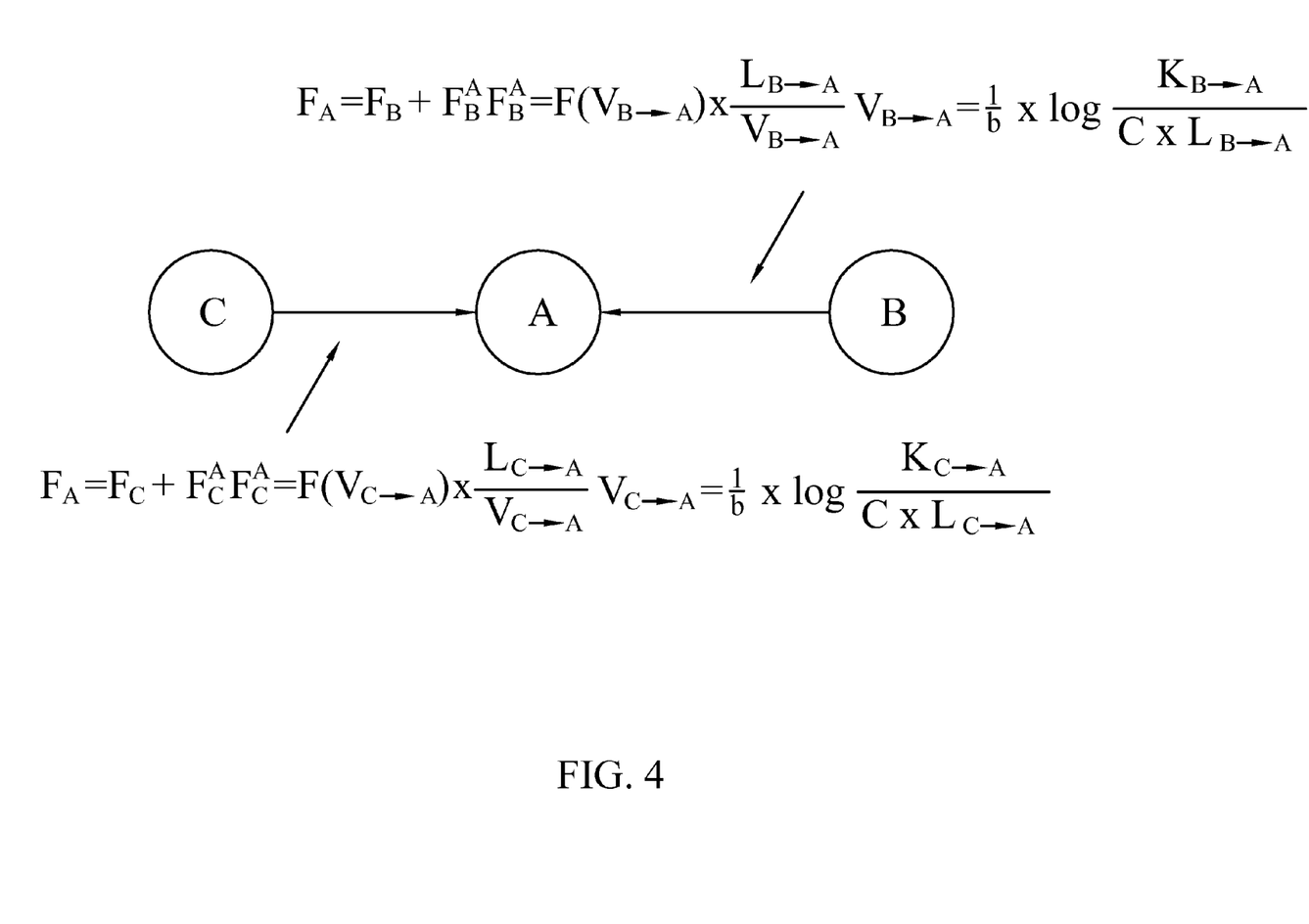
FIG. 4 is a schematic view illustrating fuel consumption of different paths to vertex A.

Based on fuel consumption, how to plan shortest paths is shown as follows. Dijkstra algorithm is modified and redesigned. A series of roads are returned when user input source and destination. In initialization, source fuel consumption is assigned 0 and other fuel consumption of vertex is assigned infinity. If there is only one vertex, then stop. Next, it is different from shortest path algorithm in the past. The fuel consumption of edge is different in the system and changes with traffic condition. FIG. 4 is an example. When vertex B and C are selected in $I_i$, fuel consumption can be computed from different vertex and label of vertex A can be replaced from lower fuel consumption. Particularly, the algorithm adds $Time_i$ to label. The $Time_i$ is important in our system because we use it to record $T_p$ in $K_{x, H}$. If fuel consumption is lowest from vertex C, the algorithm will assign vertex C to source of vertex A. Then, $V_{C,A,H}$ and $L_{C,A}$ are also used to predict arrived time to vertex A. After $Time_A$ is assigned from summation $Time_C$ and predict time $T_{C, A}$. Finally, new label will be assigned to replace label. Minimum fuel consumption is selected to $I_i$. The system selects vertex repeatedly and stops when no vertex can be selected. Then, label of destination can be used to record a series of road. The system will send this $Path_{source \rightarrow destination}$ to users from wireless. In this step, paths are planned according fuel consumption at this time. It is important to maintain navigation paths and avoid congested roads. Therefore, the system plans paths dynamically in next step.

In phase 3, how to manage the planned path is shown while driving on it. The traffic condition can be detected by server according to the traffic information from sensors. Here are two states of traffic condition: congestion and quickness. Then, the system decides whether modify the planned path based on these states. In addition, in order to avoid ping-pong effect, the system will keep old paths if the fuel-consumption of a new path is no better 10% than the old one. Moreover, detection cycle of sensors is changed on the selected paths. The cycle is decreased when the traffic log does not change for a period of time. In contrast, when traffic log shows that traffic change quickly in a short time, half of previous cycle will be assigned to sensors. In doing so, real-time traffic information can be obtained.

About multi-source to multi-destination path planning, the method is modified based on above section. There are also three phases. In the following, only the differences in each phase are described. In phase 1, the server will assign every vehicular team different team number and save destination of team to a hash table. If several teams have the same destination, they would be guided according to their priority, which can be set by their payment for this service. In phase 2 and 3, the main difference is that the navigation server should consider the joint of teams into a road. When vehicle team enters a road x, the system will increase the amount of vehicles of the road x and update the fuel cost for all team. Especially, the effect of the team on connected road is also considered, and the effect is in proportion to the distance away from the road x. This method is used to reserve resource of road, but the same resource on all roads is not reserved for a vehicular team because they may change paths. When different vehicular teams enter the same road at the same time, two solutions are proposed to solve this situation. First, if the road is not congested for adding these cars, these vehicles keep moving along the planned path without change. In contrast, vehicular team with high priority would use the road first and plan other paths for the low priority team. If they have the same priority, fuel consumption will be computed and the team with lowest fuel consumption will be chosen. For example, the fuel consumption of team A using this path is 5 liter and using other path is 8 liter. Similarly, for team B is 6 liter and 10 liter, respectively. The road will be assigned to team B because (5+10)>(6+8).

Figure 5:
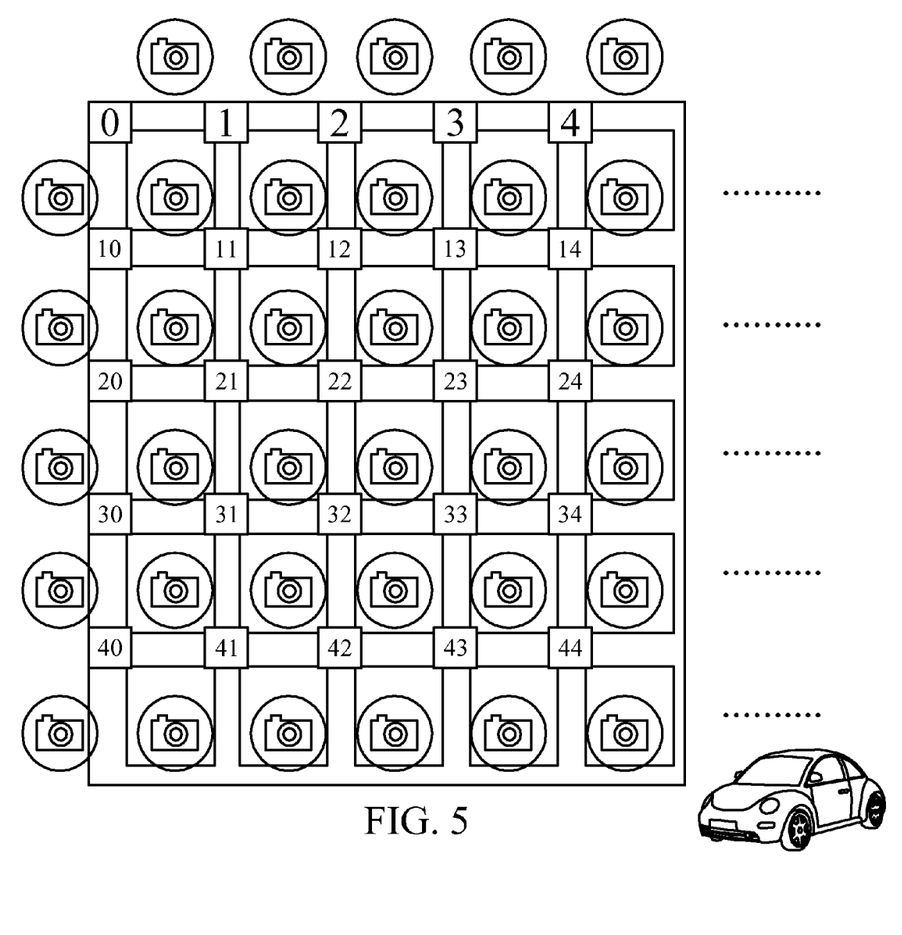
FIG. 5 is a schematic view illustrating the simulation scenario.
Figure 6:
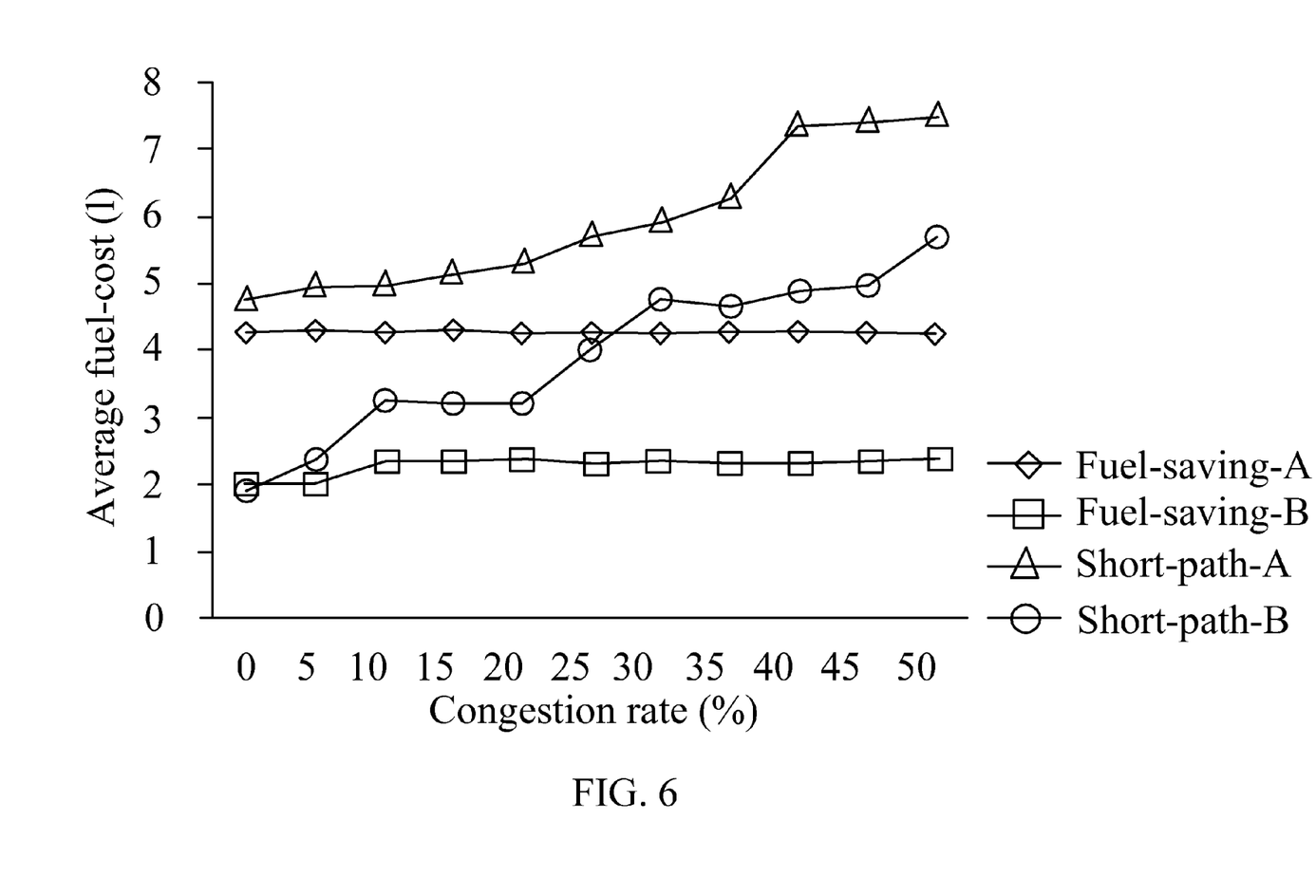
FIG. 6 is a simulation result illustrating fuel consumption for different congestion rates.
Figure 7:
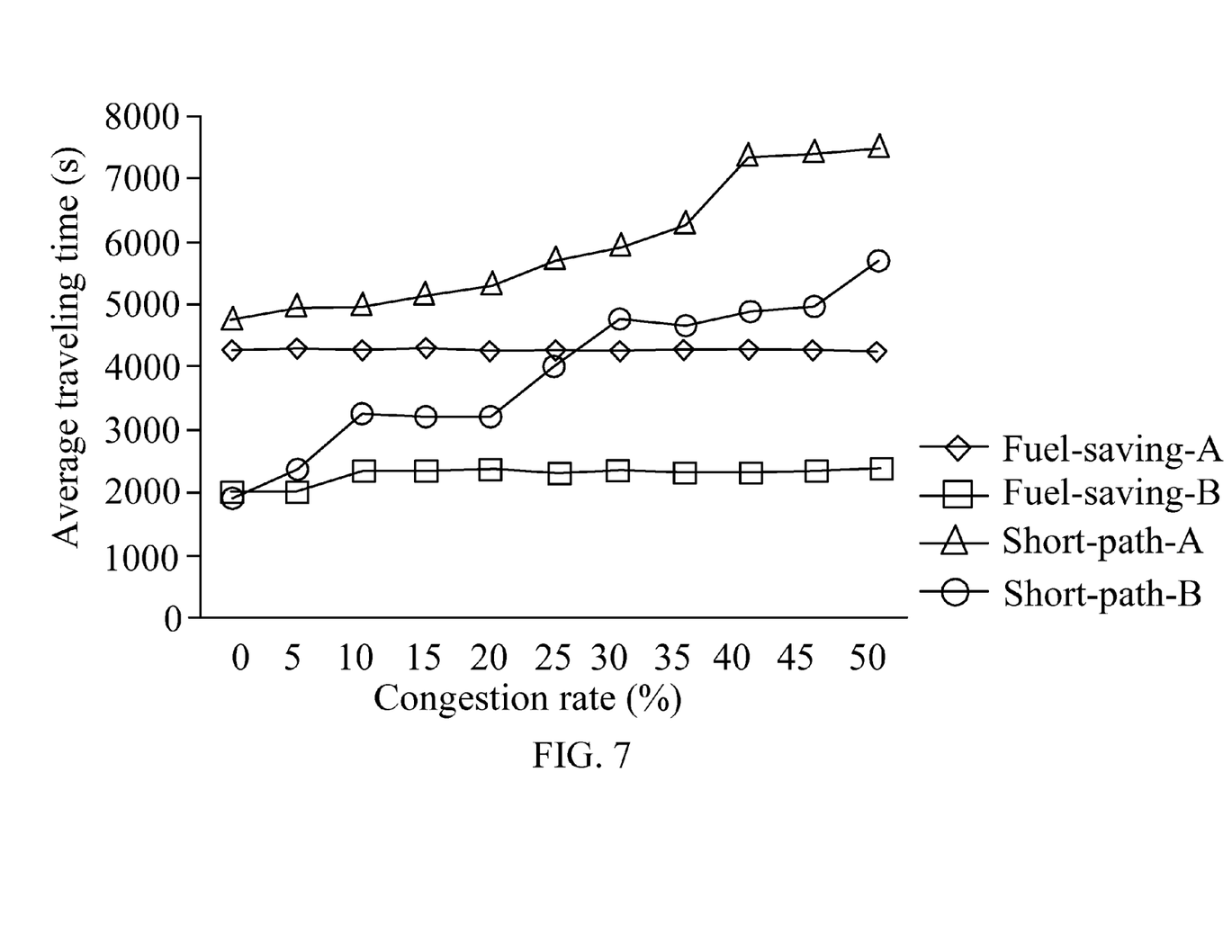
FIG. 7 is a simulation result illustrating average traveling time of proposed protocol for different congestion rates.

To verify the performance of the scheme, this invention have simulated a 50 km×50 km area with 10×10 regularly intersections, and assume that there is a sensor between two intersections, as shown in FIG. 5. Two vehicle teams are simulated and each has 30 vehicles. These two teams, A and B, start from different sources to different destinations. Another 10000 vehicles are also assigned to run on the simulation map and they will select destinations randomly and go through shortest paths. When random vehicles move to their destinations, they will stop for a while and then select new destinations again. All simulation parameters are listed in Table I. ρ is set as 0.8 because 0.8 can provide best balance between real-time and historical information from the simulations before. When the congestion rate exceeds 50%, fuel consumption of shortest path algorithm is very high and cannot compare with the algorithm. A congested road in the simulation means that the passing velocity is lower than 20 km/hr. In FIG. 6, traditional shortest-path is compared and proposed fuel-saving method. Congestion rate is assigned to express that the shortest-path is congested time for all simulation time. When the planned paths are congested, the approach will plan other paths for users. Thus, users can move to other paths and save fuel and time. Therefore, average fuel cost does not change sharply. However, if vehicles go through shortest paths without considering traffic information, their fuel cost will increase quickly. The approach can decrease over 20% fuel consumption when congestion rate exceeds 40%. By the way, fuel-cost of team B is always better than team A in the approach, because destination of team A is farer than team B. In FIG. 6, that fuel consumption of team B increases quickly than team A can be observed, because shortest paths of team B are congested on the beginning path and team A are congested on later paths. That fuel consumption is smooth in our approach also can be observed. Therefore, the system adapts congestion than shortest path algorithm. In FIG. 7, the average traveling time is simulated. It shows that the approach can reduce more 10 minutes than traditional shortest-path when congestion rate exceeds 45%.

TABLE I

Simulation Parameters

| Parameter | Value |
| --- | --- |
| C | 227 |
| b | −0.0581 |
| No. of team members | 30 vehicles |
| No. of random cars | 10000 vehicles |
| No. of intersections | 100 |
| Time out | 30000 sec. |
| ρ | 0.8 |
| Break time | 300 sec. |

In this invention, a fuel-saving path planning navigation system and a fuel-saving path planning method thereof are proposed. Previous navigation systems do not consider real-time traffic while planning navigation paths. When traveling paths are congested, users will spend more time and fuel to go to destination. This invention adopts traffic flow theory to estimate the density of a road, so the system can detect congestion quickly. Dijkstra's algorithm is modified based on fuel consumption. The system can update traffic information dynamically and plan other paths when the planned road becomes congested. Effect of other vehicles and vehicle team is also considered. In the simulation, the approach can decrease more 20% fuel consumption when vehicles travel in a traffic congestion environment. This is, this work can be a fundamental block to further research in these directions.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A fuel-saving path planning navigation system, comprising:
   a plurality of sensors monitoring a plurality of roads respectively and periodically reporting traffic information to a server, wherein the plurality of sensors detect average speed of vehicles on the plurality of roads, and the plurality of sensors report the traffic information with different cycles according to peak and off-peak periods; in the peak period, a first detection cycle is assigned to the plurality of sensors; in the off-peak period, a second detection cycle, which is longer than the first detection cycle, is assigned to the plurality of sensors;
   the server comprising:
     a storing module storing the traffic information as history information, which includes the average speed of vehicles;
     a processing module estimating how many vehicles on one of the plurality of roads based upon the history information, calculating fuel consumption of each possible planned path including current fuel consumption based on real-time traffic and future fuel consumption based on the historical information, and planning a most fuel-efficient path based on a following relation:

$$F_x = \rho \times F_{x,N} + (1-\rho) \times F_{x,H};$$

wherein $F_x$ is a fuel consumption of a road x, ρ is a real number between 0 and 1, $F_{x,N}$ is a real time fuel consumption of the road x, and $F_{x,H}$ is a fuel consumption from the history information of the road x;
   wherein the processing module further determines whether to planning a new most fuel-efficient path based on the real-time traffic while driving on the most fuel-efficient path; wherein the most fuel-efficient path is kept if the fuel consumption of the new most fuel-efficient path is not 10% better than the most fuel-efficient path.

2. The fuel-saving path planning navigation system as claimed in claim 1, wherein the sensors keep monitoring and reporting the traffic information to the server, and the processing module recalculates fuel consumption of remaining path and changes the remaining path while fuel cost of a new path better 10% than the remaining path.

3. The fuel-saving path planning navigation system as claimed in claim 1, wherein the traffic information includes a section identity, a velocity of the road x and a reporting time.

4. The fuel-saving path planning navigation system as claimed in claim 1, wherein the processing module estimating how many vehicles on a road further based upon a traffic flow theory and a following relation is satisfied:

$$D = C \times e^{bV_x};$$

wherein D is car density of the road x, $V_x$ is an average velocity of the road x, and C and b are variables related to the history information.

5. The fuel-saving path planning navigation system as claimed in claim 4, wherein the processing module further calculates fuel cost based on a fuel cost function and a following relation of the fuel cost function is satisfied:

$$F(V_x) = a \times \left( \frac{1}{b^2} V_x^2 - \frac{1}{b} + c \right);$$

wherein $V_x$ is an average velocity of the road x, and a, b and c are vehicular parameters.

6. The fuel-saving path planning navigation system as claimed in claim 5, wherein the processing module further computes a weighted number of vehicles $K_x$ and a following relation is satisfied:

$$K_x = \sum_{t=T_p/l}^{t+T_r}\left(H[t] \times e^{-\left(t-\frac{T_p}{l}\right)}\right);$$

wherein $T_p$ is how much time to arrive at the road x and $T_p$ is a weighted range of the history information.

7. The fuel-saving path planning navigation system as claimed in claim 6, wherein the processing module further uses $K_x$ to calculate a speed of the road x and $L_x$ is a length of the road x and a following relation is satisfied:

$$V_{x,H} = \frac{1}{b} \times \log\frac{K_x}{C \times L_x}.$$

8. The fuel-saving path planning navigation system as claimed in claim 7, wherein the processing module further uses $V_{x,H}$ to calculate the future fuel consumption of the road x at a time t and $L_x$ is the length of the road x and a following relation is satisfied:

$$F_{x,H} = F(V_{x,H}) \times \frac{L_x}{V_{x,H}}.$$

9. A fuel-saving path planning method, comprising following steps:
monitoring a plurality of roads respectively and periodically reporting traffic information to a server by a plurality of sensors, wherein the plurality of sensors detect average speed of vehicles on the plurality of roads, and the plurality of sensors report the traffic information with different cycles according to peak and off-peak periods; in the peak period, a first detection cycle is assigned to the plurality of sensors; in the off-peak period, a second detection cycle, which is longer than the first detection cycle, is assigned to the plurality of sensors;
storing the traffic information as history information, which includes the average speed of vehicles, to a storing module;
estimating how many vehicles on one of the plurality of roads based upon the history information by a processing module;
calculating fuel consumption of each possible planned path including current fuel consumption based on real-time traffic and future fuel consumption based on the historical information by the processing module; and
planning a most fuel-efficient path by the processing module based on a following relation:

$$F_x = \rho \times F_{x,N} + (1-\rho) \times F_{x,H};$$

wherein $F_x$ is a fuel consumption of a road x, $\rho$ is a real number between 0 and 1, $F_{x,N}$ is a real time fuel consumption of the road x, and $F_{x,H}$ is a fuel consumption from the history information of the road x;
determining whether to planning a new most fuel-efficient path based on the real-time traffic while driving on the most fuel-efficient path, wherein the most fuel-efficient path is kept if the fuel consumption of the new most fuel-efficient path is not 10% better than the most fuel-efficient path.

10. The fuel-saving path planning method as claimed in claim 9, further comprising the following step:
using the sensors to keep monitoring and reporting the traffic information to the server; and
recalculating fuel consumption of remaining path and changing the remaining path by the processing module while fuel cost of a new path better 10% than the remaining path.

11. The fuel-saving path planning method as claimed in claim 9, wherein the traffic information includes a section identity, a velocity of the road x and a reporting time.

12. The fuel-saving path planning method as claimed in claim 9, wherein the processing module estimates how many vehicles on a road further based upon a traffic flow theory and a following relation is satisfied:

$$D = C \times e^{bV_x};$$

wherein D is car density of the road x, $V_x$ is an average velocity of the road x, and C and b are variables related to the history information.

13. The fuel-saving path planning method as claimed in claim 12, wherein the processing module further calculates fuel cost based on a fuel function and a following relation of the fuel cost function is satisfied:

$$F(V_x) = a \times \left(\frac{1}{b^2}V_x^2 - \frac{1}{b} + c\right);$$

wherein $V_x$ is an average velocity of the road x, and a, b and c are vehicular parameters.

14. The fuel-saving path planning method as claimed in claim 13, wherein the processing module further computes a weighted number of vehicles $K_x$ and a following relation is satisfied:

$$K_x = \sum_{t=T_p/l}^{t+T_r}\left(H[t] \times e^{-\left(t-\frac{T_p}{l}\right)}\right);$$

wherein $T_p$ is how much time to arrive at the road x and $T_p$ is a weighted range of the history information.

15. The fuel-saving path planning method as claimed in claim 14, wherein the processing module further uses $K_x$ to calculate a speed of the road x and $L_x$ is a length of the road x and a following relation is satisfied:

$$V_{x,H} = \frac{1}{b} \times \log\frac{K_x}{C \times L_x}.$$

16. The fuel-saving path planning method as claimed in claim 15, wherein the processing module further uses $V_{x,H}$ to calculate the future fuel consumption of the road x at a time t and $L_x$ is the length of the road x and a following relation is satisfied:

$$F_{x,H} = F(V_{x,H}) \times \frac{L_x}{V_{x,H}}.$$

* * * * *